United States Patent
Freeman et al.

(12) 
(10) Patent No.: US 7,381,095 B2
(45) Date of Patent: Jun. 3, 2008

(54) MULTI-STANDARD CONNECTION HUB AND METHOD OF MANUFACTURING SAME

(75) Inventors: Mark Freeman, Torrance, CA (US); Edgar Carrasco, Lynwood, CA (US)

(73) Assignee: Belkin International, Inc., Compton, CA (US)

( * ) Notice: Subject to any disclaimer, the term of this patent is extended or adjusted under 35 U.S.C. 154(b) by 335 days.

(21) Appl. No.: 11/157,237

(22) Filed: Jun. 20, 2005

(65) Prior Publication Data

US 2006/0286840 A1    Dec. 21, 2006

(51) Int. Cl.
*H01R 25/00* (2006.01)
(52) U.S. Cl. .................. 439/638; 439/928; 361/686
(58) Field of Classification Search ............... 439/752, 439/218, 638, 928; 361/686
See application file for complete search history.

(56) References Cited

U.S. PATENT DOCUMENTS

| | | | |
|---|---|---|---|
| 3,990,763 A | 11/1976 | Kress | |
| 4,119,359 A | 10/1978 | Schultz | |
| 4,401,351 A | 8/1983 | Record | |
| 4,501,460 A | 2/1985 | Sisler | |
| 4,558,914 A | 12/1985 | Prager et al. | |
| 4,688,864 A | 8/1987 | Sorel | |
| D301,713 S | 6/1989 | Bolan et al. | |
| 4,845,589 A | 7/1989 | Weidler et al. | |
| 4,850,485 A | 7/1989 | Ishikawa | |
| D313,340 S | 1/1991 | Stathis et al. | |
| 5,030,128 A | 7/1991 | Herron et al. | |
| 5,247,406 A | 9/1993 | Apple et al. | |
| 5,333,097 A | 7/1994 | Christensen et al. | |
| 5,336,102 A | 8/1994 | Cairns et al. | |
| D350,944 S | 9/1994 | Shewmon et al. | |
| 5,358,420 A | 10/1994 | Cairns et al. | |
| D354,903 S | 1/1995 | Mockett | |
| 5,381,315 A | 1/1995 | Hamaguchi et al. | |
| D355,416 S | 2/1995 | McCay et al. | |
| D358,980 S | 6/1995 | Mockett | |
| 5,440,181 A | 8/1995 | Gruender, Jr. et al. | |
| D362,663 S | 9/1995 | Nguyen | |
| D365,333 S | 12/1995 | Mihalik et al. | |
| D366,455 S | 1/1996 | Cheng | |
| 5,483,419 A | 1/1996 | Kaczeus, Sr. et al. | |
| 5,498,174 A | 3/1996 | Speer et al. | |
| 5,515,239 A | 5/1996 | Kamerman et al. | |
| D375,909 S | 11/1996 | Dziersk et al. | |
| 5,586,002 A | 12/1996 | Notarianni | |
| 5,591,048 A | 1/1997 | Hahn | |

(Continued)

FOREIGN PATENT DOCUMENTS

GB    2350032    11/2000

(Continued)

*Primary Examiner*—Michael C. Zarroli
(74) *Attorney, Agent, or Firm*—Bryan Cave LLP

(57) ABSTRACT

A multi-standard connection hub includes a housing (110) having a first surface (111), a second surface (112) spaced apart from the first surface, and a sidewall (113) extending between the first surface and the second surface. The multi-standard connection hub further includes a first connection port (120) at the first surface and a second connection (210) port at the sidewall. The first connection port operates according to a first standard and the second connection port operates according to a second standard.

24 Claims, 4 Drawing Sheets

U.S. PATENT DOCUMENTS

| | | |
|---|---|---|
| 5,604,662 A | 2/1997 | Anderson et al. |
| 5,621,890 A | 4/1997 | Notarianni et al. |
| D379,972 S | 6/1997 | Mihalik et al. |
| 5,645,434 A | 7/1997 | Leung |
| 5,673,172 A | 9/1997 | Hastings et al. |
| 5,692,400 A | 12/1997 | Bliven et al. |
| 5,700,159 A | 12/1997 | Albeck |
| 5,706,179 A | 1/1998 | Palatov |
| D391,944 S | 3/1998 | Han |
| D392,147 S | 3/1998 | Gervais et al. |
| 5,726,922 A | 3/1998 | Womble et al. |
| D393,451 S | 4/1998 | Faranda et al. |
| 5,737,189 A | 4/1998 | Kammersgard et al. |
| 5,772,456 A | 6/1998 | Ohishi |
| 5,777,845 A | 7/1998 | Krum et al. |
| RE35,915 E | 10/1998 | Hastings et al. |
| 5,822,184 A | 10/1998 | Rabinovitz |
| 5,825,618 A | 10/1998 | Schnoor et al. |
| 5,835,353 A | 11/1998 | Dalby |
| 5,871,368 A | 2/1999 | Erdner et al. |
| 5,875,094 A | 2/1999 | Kirkendoll |
| D408,012 S | 4/1999 | Brownlie |
| 5,896,273 A | 4/1999 | Varghese et al. |
| D411,989 S | 7/1999 | Grossman et al. |
| D412,322 S | 7/1999 | Wu |
| D412,494 S | 8/1999 | Tamaki et al. |
| 5,938,473 A | 8/1999 | Nishio et al. |
| 5,940,319 A | 8/1999 | Durlam et al. |
| D413,893 S | 9/1999 | Luzbetak et al. |
| 5,956,267 A | 9/1999 | Hurst et al. |
| D415,741 S | 10/1999 | Lee et al. |
| D416,007 S | 11/1999 | Cavello |
| D416,559 S | 11/1999 | Hoyt et al. |
| 6,018,456 A | 1/2000 | Young et al. |
| D419,978 S | 2/2000 | Mah |
| 6,024,599 A | 2/2000 | Stathis et al. |
| D421,962 S | 3/2000 | Varga |
| D422,267 S | 4/2000 | Richards |
| D423,010 S | 4/2000 | Wicks |
| 6,047,572 A | 4/2000 | Bliven et al. |
| 6,050,849 A | 4/2000 | Chang |
| 6,052,278 A | 4/2000 | Tanzer et al. |
| D425,866 S | 5/2000 | Nagasawa et al. |
| 6,073,188 A | 6/2000 | Fleming |
| 6,076,142 A | 6/2000 | Corrington et al. |
| 6,098,131 A | 8/2000 | Unger et al. |
| 6,108,198 A | 8/2000 | Lin |
| 6,141,221 A | 10/2000 | Tong et al. |
| 6,147,859 A | 11/2000 | Abboud |
| 6,153,443 A | 11/2000 | Durlam et al. |
| D435,558 S | 12/2000 | Tong et al. |
| D436,109 S | 1/2001 | Tong et al. |
| 6,174,737 B1 | 1/2001 | Durlam et al. |
| 6,211,090 B1 | 4/2001 | Durlam et al. |
| D444,462 S | 7/2001 | Tsuji |
| 6,254,427 B1 | 7/2001 | Stathis |
| D450,686 S | 11/2001 | Beaumont et al. |
| 6,331,938 B1 | 12/2001 | Hsieh et al. |
| 6,349,036 B1 | 2/2002 | Chang et al. |
| D458,608 S | 6/2002 | Tong et al. |
| 6,430,084 B1 | 8/2002 | Rizzo et al. |
| 6,430,085 B1 | 8/2002 | Rizzo |
| D462,689 S | 9/2002 | Moran |
| D465,223 S | 11/2002 | Milan |
| 6,052,278 C1 | 5/2003 | Tanzer et al. |
| D475,996 S | 6/2003 | Skulley |
| 6,607,408 B2 | 8/2003 | Milan |
| 6,609,928 B1 | 8/2003 | Le |
| 6,650,549 B1 | 11/2003 | Chiao |
| 6,669,513 B2 | 12/2003 | Huang |
| 6,716,047 B2 | 4/2004 | Milan |
| 6,720,597 B2 | 4/2004 | Janesky et al. |
| 6,722,917 B2 | 4/2004 | Huang |
| D500,497 S | 1/2005 | Yu et al. |
| 6,905,374 B2 | 6/2005 | Milan |
| D510,091 S | 9/2005 | Mori et al. |
| D512,718 S | 12/2005 | Mori et al. |
| 6,983,341 B1 | 1/2006 | Lim et al. |
| 2003/0225954 A1 | 12/2003 | Wu |
| 2004/0234254 A1 | 11/2004 | Czupich et al. |
| 2005/0047099 A1 | 3/2005 | Mori et al. |
| 2005/0094355 A1 | 5/2005 | Mori et al. |
| 2005/0282417 A1 | 12/2005 | Tsao |

FOREIGN PATENT DOCUMENTS

| | | |
|---|---|---|
| JP | 2000-163168 | 6/2000 |
| JP | 2000-231969 | 8/2000 |
| JP | 2000-311168 | 11/2000 |
| JP | 2001-102136 | 4/2001 |

MULTI-STANDARD CONNECTION HUB AND METHOD OF MANUFACTURING SAME

FIELD OF THE INVENTION

This invention relates generally to electrical connection hubs, and relates more particularly to such hubs that operate according to more than one connection standard.

BACKGROUND OF THE INVENTION

Electronics technology has provided computer users with enhanced connectivity capabilities between computers and an increasingly wider range of peripheral devices. Connection hubs incorporating multiple connection ports into a single housing make it possible to connect multiple peripheral devices to each other or to a computer via a particular communications standard. Existing connection hubs offer multiple connection ports in a variety of configurations, but do not adequately provide connectivity for devices operating according to differing communication standards. Accordingly, there exists a need for a connection hub having connection ports that operate according to more than communication standard.

BRIEF DESCRIPTION OF THE DRAWINGS

The invention will be better understood from a reading of the following detailed description, taken in conjunction with the accompanying figures in the drawings in which.

Figure 1:
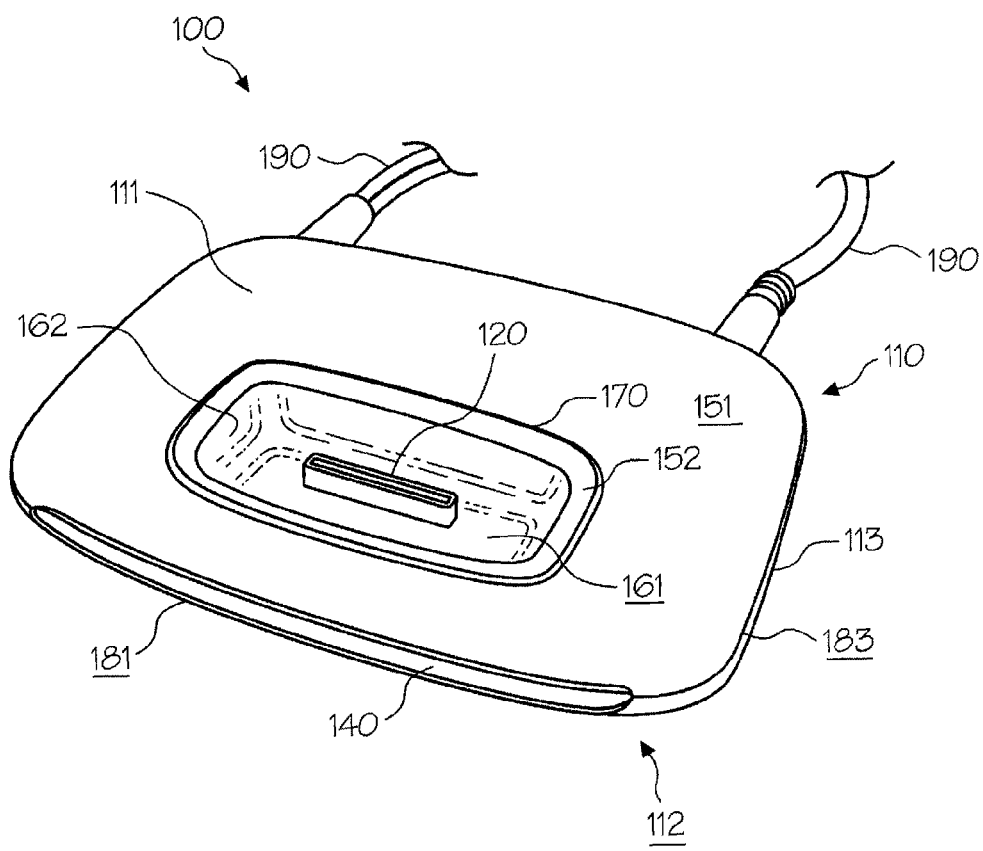
FIG. 1 is a perspective view of a multi-standard connection hub according to an embodiment of the invention.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical, mechanical, or other manner.

DETAILED DESCRIPTION OF THE DRAWINGS

In one embodiment of the invention, a multi-standard connection hub comprises a housing having a first surface, a second surface spaced apart from the first surface, and a sidewall extending between the first surface and the second surface. The multi-standard connection hub further comprises a first connection port at the first surface and a second connection port at the sidewall. The first connection port operates according to a first standard and the second connection port operates according to a second standard.

Figure 2:
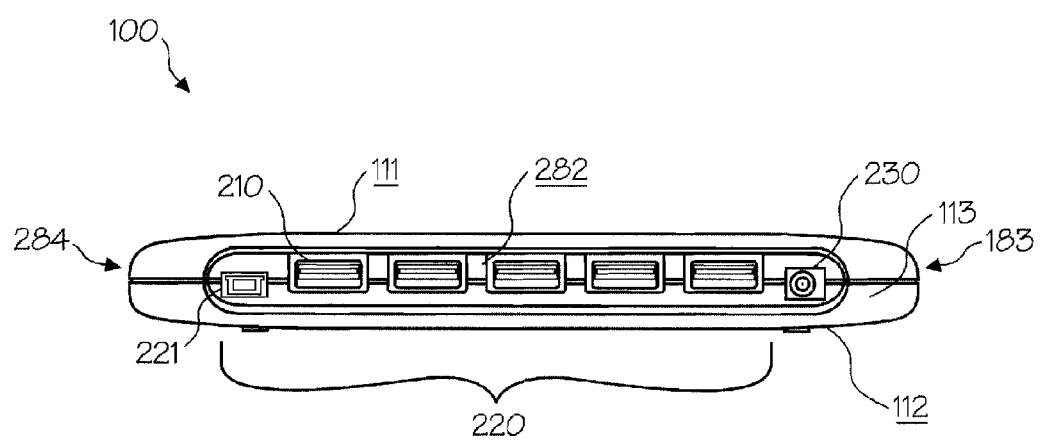
FIG. 2 is a rear elevational view of the multi-standard connection hub according to an embodiment of the invention.

Referring now to the figures, FIG. 1 is a perspective view and FIG. 2 is a rear elevational view of a multi-standard connection hub 100 according to an embodiment of the invention. As illustrated in FIGS. 1 and 2, multi-standard connection hub 100 comprises a housing 110 having a surface 111, a surface 112 spaced apart from surface 111, and a sidewall 113 extending between surface 111 and surface 112. In the illustrated embodiment, surface 112 is a bottom surface on which multi-standard connection hub 100 rests when multi-standard connection hub 100 is placed on a desktop or other surface. Accordingly, surface 112 is not explicitly shown in FIG. 1, but it is indicated by an arrow adjacent to reference numeral 112.

As is clear from the foregoing description, surfaces 111 and 112 are spaced apart by sidewall 113, which in one embodiment is substantially perpendicular to surfaces 111 and 112. Accordingly, multi-standard connection hub 100 comprises an interior space defined by surface 111, surface 112, and sidewall 113. That interior space contains circuitry and other components necessary or useful to the functioning of multi-standard connection hub 100. Because the internal components and circuitry of multi-standard connection hub 100 are known in the art, they are not further discussed herein.

Multi-standard connection hub 100 further comprises a connection port 120 at surface 111 and a connection port 210 at sidewall 113. Connection port 120 operates according to a first standard and connection port 210 operates according to a second standard. As it used herein, the word "standard" in the context of electronic communication, data exchange, and the like refers to a particular connection and communication protocol that includes the hardware forming the actual physical connector, the software that enables and defines the electronic communication and data exchange, the circuitry that carries electronic signals, and every other component, feature, or specification that enables a specific electronic device to communicate or otherwise be used with a computer or the like (not shown).

As an example, the first standard can be one that enables a connection between multi-standard connection hub 100 and an MP3 player, a personal digital assistant (PDA), a telecommunications device, an external memory device, a digital camera, or the like. In a particular manifestation of the example, connection port 120 is a dock connector capable of receiving a corresponding connector on an MP3 player operating according to a proprietary standard. There exist, for example, MP3 players having multiple-pin dock connectors that operate according to standards that may be utilized under license to their owners. Accordingly, in one embodiment connection port 120 comprises a multiple-pin dock connector.

The second standard, as an example, can be one that enables a high-speed data connection between a computer and a computer peripheral, neither of which are shown in FIG. 1 or 2. FireWire and Universal Serial Bus (USB) are two examples of such standards. Both FireWire and USB operate according to particular specifications that are well defined and well known in the art.

Surface 111 comprises a region 151 and a region 152 that is a depression in region 151. Region 152 comprises a floor 161 and a sidewall 162 extending away from floor 161 and rising to meet region 151 at a perimeter 170. Connection port 120 is in the depression and is located at floor 161. In the illustrated embodiment, sidewall 162 is substantially perpendicular both to floor 161 and to region 151. Region 152 is capable of containing a portion of the device to be connected to connection port 120, and of retaining the device in place during a time in which the device is to be so connected.

In the illustrated embodiment, connection port 210 is one of a plurality 220 of connection ports operating according to the second standard. Multi-standard connection hub 100, in the illustrated embodiment, thus enables a connection between a computer and multiple peripheral devices at sidewall 113. A connection port 221, which is one of plurality 220, is an upstream connection port, meaning that connection port 221 is configured to receive one end of a cable the other end of which is attached to a computer. As an example, connection port 221 can be a mini B USB port. Connection port 210 and the remaining connection ports in plurality 220 are downstream connection ports, meaning they are configured to receive a cable or other connection from a peripheral device such as a printer, a scanner, a light, a fan, or the like.

As shown in FIG. 2, each connection port in plurality 220 is located at sidewall 113. Multi-standard connection hub 100 further comprises a power port 230, also located at sidewall 113. More specifically, power port 230 and the connection ports in plurality 220 are located at a particular side of sidewall 113, as will now be further discussed with reference to FIGS. 1 and 2. Sidewall 113 comprises a side 181, a side 282 spaced apart from and substantially parallel to side 181, a side 183 extending between and substantially perpendicular to side 181 and side 282, and a side 284 extending between and substantially perpendicular to sides 181 and 282, and spaced apart from and substantially parallel to side 183. Power port 230 and the connection ports in plurality 220 are located at side 282. The result in the illustrated embodiment is that cables 190 extend away from multi-standard connection hub 100 in a single direction, thus contributing to a neat, orderly appearance for multi-standard connection hub 100.

Multi-standard connection hub 100 further comprises a status indicator 140 at side 181 of sidewall 113. Status indicator 140 indicates a status of at least one of power port 230, connection port 210, connection port 221, or connection port 120. As an example, status indicator 140 can light up to indicate that adequate power is being provided to multi-standard connection hub 100, that one or more of power port 230, connection port 210, connection port 221, and connection port 120 are functioning properly, or the like. As a further example, status indicator 140 can comprise a light emitting diode or the like. In one embodiment, status indicator 140 further comprises a translucent material that forms a portion of side 181 of sidewall 113 and through which the light emitting diode or the like is visible. In the same or another embodiment, status indicator 140 is one of a group of status indicators, each of which, for example, can provide an indication relevant to the operation of one or more of the components of multi-standard connection hub 100.

As discussed above, connection port 120 and region 152 of surface 111 may be used to facilitate and enable a connection between multi-standard connection hub 100 and a device operating according to a particular standard. In one embodiment, a further component of multi-standard connection hub 100 enhances or enables such connection, as will now be described with reference to FIG. 3, as well as to FIGS. 1 and 2.

Figure 3:
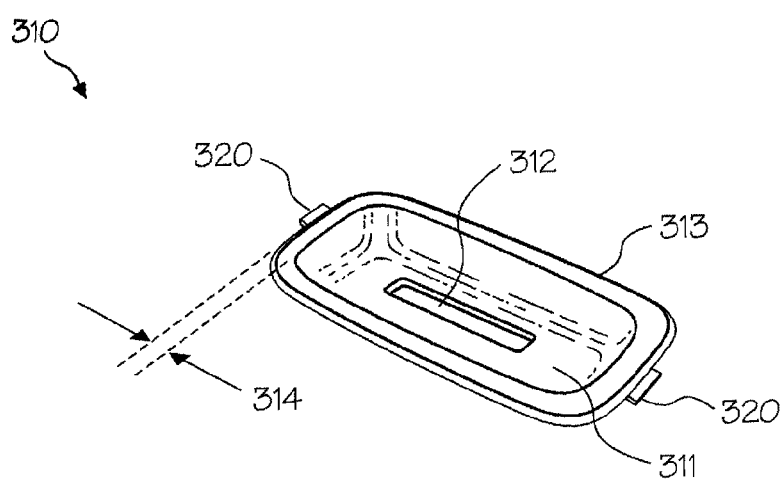
FIG. 3 is a perspective view of an adapter that forms a part of the multi-standard connection hub according to an embodiment of the invention.

FIG. 3 is a perspective view of an adapter 310 that forms a part of multi-standard connection hub 100 according to an embodiment of the invention. As illustrated in FIG. 3, adapter 310 comprises a base 311 having an aperture 312 therein, a sidewall 313 having a thickness 314. Adapter 310 is capable of being removably coupled to housing 110 by being placed within region 152. Such placement of adapter 310 reduces a volume of region 152 by an amount related to thickness 314. As an example, region 152 has a first volume defined by floor 161 and sidewall 162, while adapter 310 has a second volume defined by base 311 and sidewall 313. The second volume is smaller than the first volume by an amount roughly equal to thickness 314 multiplied by the linear extent of sidewall 313.

Aperture 312 provides access to connection port 120 when adapter 310 is in region 152. In one embodiment, at least one of housing 110 and adapter 310 further comprises a retention mechanism capable of retaining adapter 310 in region 152. In the illustrated embodiment, adapter 310 further comprises a retention mechanism 320 in the form of a flexible tab or the like. As an example, retention mechanism 320 is capable of interacting with housing 110, or possibly with a similar retention mechanism (not shown) that forms a part of housing 110 or another component of multi-standard connection hub 100, in order to accomplish the task of retaining adapter 310 in region 152. As a particular example, retention mechanism 320 can snap onto housing 110 by flexing to engage with a portion of housing 110. Retention mechanism 320 can be snapped out of or otherwise removed from region 152 following the same or a different procedure.

In a particular embodiment, multi-standard connection hub 100 is part of a system comprising, in addition to multi-standard connection hub 100 and adapter 310, at least one additional adapter (not shown) having a sidewall with a thickness greater than thickness 314. In that particular embodiment, a user of multi-standard connection hub 100 can insert adapter 310 in region 152 in order to create a volume tailored to snugly receive a first electronic device having a width substantially equal to, thought slightly smaller than, a width of adapter 310. Similarly, the user can insert the additional adapter with its thicker sidewall in order to create a volume tailored to snugly receive a second electronic device having a lesser width than that of the first electronic device. The process can be repeated with adapters having successively thicker sidewalls that create successively smaller volumes suitable for successively smaller electronic devices. Each one of the adapters just described would have an aperture similar to aperture 312 in both size and shape, such that connection port 120 would be accessible at the aperture no matter which one of the adapters was in use.

Figure 4:
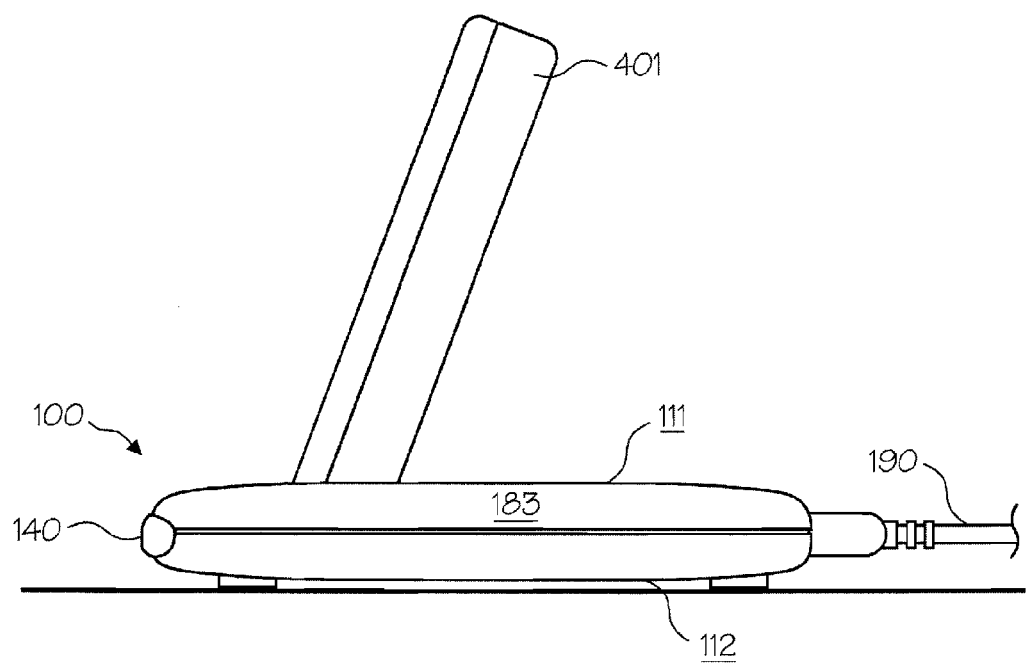
FIG. 4 is a side elevational view of the multi-standard connection hub after an electronic device has been placed therein according to an embodiment of the invention.

FIG. 4 is a side elevational view of multi-standard connection hub 100 after an electronic device 401 has been placed in region 152 (see FIG. 1) according to an embodiment of the invention and according to the foregoing description.

Figure 5:
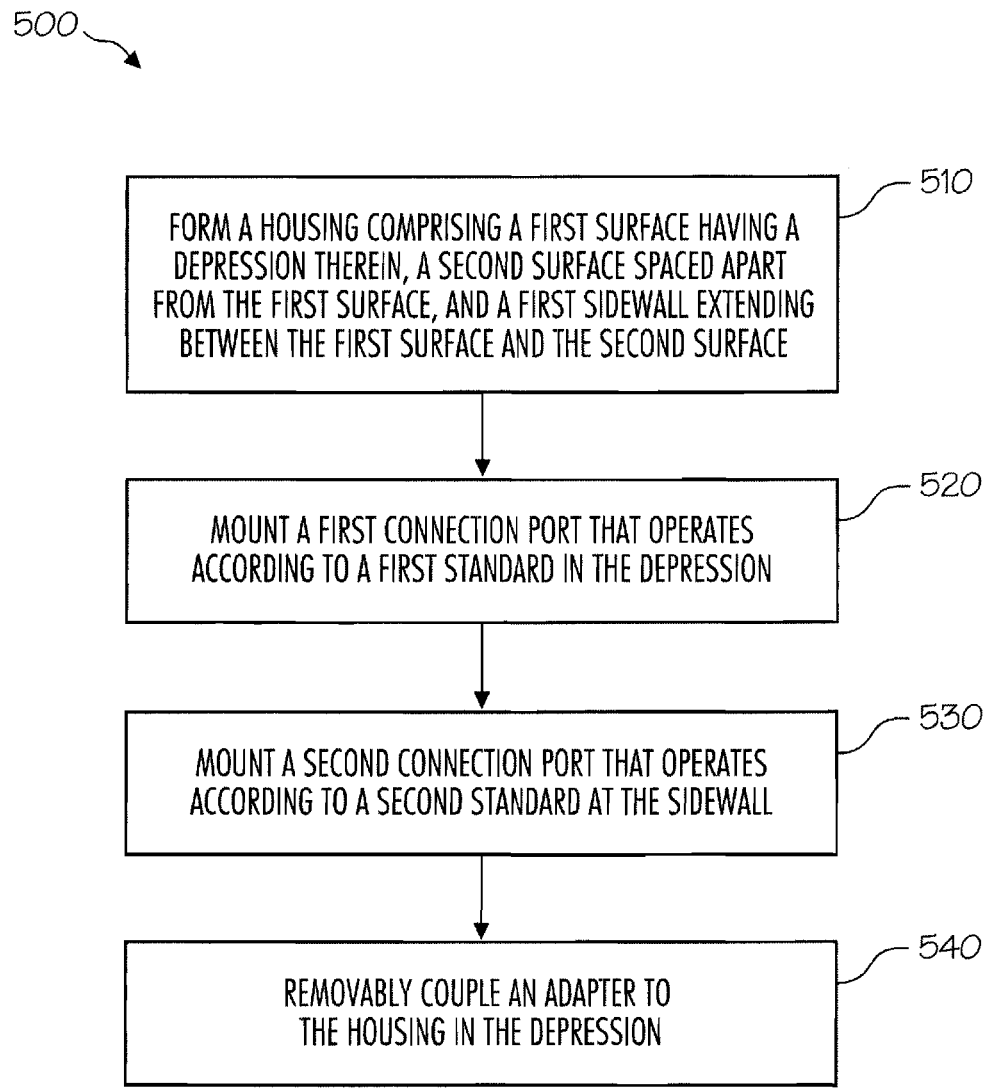
FIG. 5 is a flowchart illustrating a method of manufacturing a multi-standard connection hub according to an embodiment of the invention.

FIG. 5 is a flowchart illustrating a method 500 of manufacturing a multi-standard connection hub according to an embodiment of the invention. A step 510 of method 500 is to form a housing comprising a first surface having a depression therein, a second surface spaced apart from the first surface, and a first sidewall extending between the first surface and the second surface. As an example, the housing can be similar to housing 110, the first surface can be similar to surface 111, the depression can be similar to that formed by region 152, the second surface can be similar to surface 112, and the first sidewall can be similar to sidewall 113, all of which were first shown in FIG. 1.

A step 520 of method 500 is to mount a first connection port that operates according to a first standard in the depression. As an example, the first connection port can be similar to connection port 120, shown in FIG. 1.

A step 530 of method 500 is to mount a second connection port that operates according to a second standard at the sidewall. As an example, the second connection port can be similar to connection port 210, shown in FIG. 2. In one embodiment, step 530 is performed simultaneously with step 510 and or step 520. As an example, steps 510, 520, and 530 can be performed as part of an injection molding process.

A step 540 of method 500 is to removably couple an adapter to the housing in the depression. As an example, the adapter can be similar to adapter 310, shown in FIG. 3.

Although the invention has been described with reference to specific embodiments, it will be understood by those skilled in the art that various changes may be made without departing from the spirit or scope of the invention. As an example, the various connection ports described herein may be located at surfaces other than those shown. As another example, the shape of the housing can differ from that shown in the figures. As yet another example, the retention mechanism can operate differently from and/or have a different form than what was described herein. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the connection hub discussed herein may be implemented in a variety of embodiments, and that the foregoing discussion of certain of these embodiments does not necessarily represent a complete description of all possible embodiments.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A multi-standard connection hub comprising:
   a housing comprising:
      a first surface;
      a second surface spaced apart from the first surface; and
      a first sidewall extending between the first surface and the second surface;
   a first connection port operating according to a first standard at the first surface; and
   a second connection port operating according to a second standard at the first sidewall;
   wherein:
      the first surface comprises a first region and a second region;
      the second region is a depression in the first region;
      the second region comprises a floor and a second sidewall extending away from the floor and rising to meet the first region;
      the first connection port is in the depression and located at the floor;
      the second sidewall is substantially perpendicular to the floor and to the first region; and
      the second connection port is one of a plurality of connection ports operating according to the second standard;
   a power port at the first sidewall;
   wherein:
      the first sidewall comprises:
         a first side;
         a second side spaced apart from and substantially parallel to the first side;
         a third side extending between and substantially perpendicular to the first side and the second side; and
         a fourth side extending between and substantially perpendicular to the first side and the second side and spaced apart from and substantially parallel to the third side; and
      the power port and each one of the plurality of connection ports are located at the first side.

2. The multi-standard connection hub of claim 1 further comprising:
   a status indicator at the second side,
   wherein:
      at least a portion of the second side comprises a translucent material;
      the status indicator is visible through the portion of the second side; and
      the status indicator indicates a status of at least one of the power port, the first connection port, and the second connection port.

3. The multi-standard connection hub of claim 2 wherein:
   the first connection port is a multiple-pin dock connector; and
   the second connection port is a universal serial bus port.

4. A multi-standard connection hub comprising:
   a housing comprising:
      a first surface comprising a first region and a second region that is a depression in the first region;

a second surface spaced apart from the first surface; and a first sidewall extending between and substantially perpendicular to the first surface and the second surface;

a first connection port in the depression operating according to a first standard;

a second connection port at the first sidewall operating according to a second standard; and an adapter removably coupled to the housing at the depression;

wherein:

the second region comprises a floor and a second sidewall extending away from the floor and rising to meet the first region; and the first connection port is accessible when the adapter is coupled to the housing at the depression; and the adapter comprises:

a base having an aperture therein; and a third sidewall having a thickness;

the depression defines a first volume;

the third sidewall and the base define a second volume;

the aperture provides access to the first connection port when the adapter is in the depression; and the second volume is smaller than the first volume.

5. The multi-standard connection hub of claim 4 wherein:

at least one of the housing and the adapter further comprises a retention mechanism capable of retaining the adapter in the depression.

6. The multi-standard connection hub of claim 5 wherein:

the second connection port is one of a plurality of connection ports operating according to the second standard;

each one of the plurality of connection ports is located at the first sidewall; and the housing further comprises a power port at the first sidewall.

7. The multi-standard connection hub of claim 6 wherein:

the first sidewall comprises:

a first side;

a second side spaced apart from and substantially parallel to the first side;

a third side extending between and substantially perpendicular to the first side and the second side; and a fourth side extending between and substantially perpendicular to the first side and the second side and spaced apart from and substantially parallel to the third side; and the power port and each one of the plurality of connection ports are located at the first side.

8. The multi-standard connection hub of claim 4 wherein:

the first connection port is a multiple-pin dock connector; and the second connection port is a universal serial bus port.

9. The multi-standard connection hub of claim 4 wherein:

the multi-standard connection hub is part of a system comprising:

the multi-standard connection hub;

the adapter; and at least one additional adapter having a second sidewall with a second thickness greater than the first thickness.

10. The multi-standard connection hub of claim 9 wherein:

the first connection port is a multiple-pin dock connector; and the second connection port is a universal serial bus port.

11. The multi-standard connection hub of claim 10 wherein:

the second connection port is one of a plurality of connection ports operating according to the second standard;

one of the plurality of connection ports is a downstream universal serial bus port; and a different one of the plurality of connection ports is an upstream serial bus port.

12. A hub for connecting any one of a plurality of different size electronic devices to a computer, wherein each of the electronic devices communicates using a first standard, the hub comprising:

a housing comprising:

a depression;

a first connection port located in the depression, operating according to the first standard, and configured to be connected to any one of the electronic devices; and a second port operating according to a second standard and configured to be connected to the computer;

a first adapter configured to be removably inserted within the depression and having an aperture therein sized and shaped to provide access therethrough to the first connection port when the first adapter is located within the depression, wherein the first adapter has a first thickness;

a second adapter configured to be removably inserted within the depression and having an aperture therein sized and shaped to provide access therethrough to the first connection port when the second adapter is located within the depression, wherein the second adapter has a second thickness that is greater than the first thickness; and wherein the first thickness is selected, and the first adapter is tailored, for the hub containing the first adapter to receive a first electronic device of a first size when the first electronic device is electrically connected to the first connection port, and the second thickness is selected, and the second adapter is tailored, for the hub containing the second adapter to receive a second electronic device of a second size when the second electronic device is electrically connected to the first connection port, wherein the second size is smaller than the first size.

13. The hub of claim 12 further comprising at least one retention mechanism configured to removably hold the first adapter in the depression, and configured to removably hold the second adapter in the depression.

14. The hub of claim 12 wherein each of the first adapter and the second adapter are configured to snap into the depression.

15. The hub of claim 12 wherein the hub includes a bottom surface and a top surface spaced apart from the bottom surface, wherein the depression is in the top surface, and wherein the first adapter and the hub are tailored to receive and hold the first electronic device at an angle when the first electronic device is electrically connected to the first connection port.

16. The hub of claim 12 further comprising a third connection port and a fourth connection port, both operating according to the second standard, wherein the second connection port, the third connection port, and the fourth connection port are universal serial bus ports, wherein the second connection port is a downstream universal serial bus port and the third and the fourth connection ports are upstream universal serial bus ports.

17. The hub of claim 16 wherein the hub includes a bottom surface, a top surface spaced apart from the bottom surface, and a sidewall extending from the bottom surface to the top surface, wherein the depression is in the top surface, and wherein the second connection port, the third connection port, and the fourth connection port are located in the sidewall.

18. The hub of claim 12 further comprising a status indicator, wherein at least a portion of the hub comprises a translucent material and the status indicator is visible through the translucent material.

19. A USB hub that also connects a computer to an MP3 player, the USB hub comprising:
   a housing:
   a depression in the housing that is configured to receive an MP3 player;
   an upstream universal serial bus port configured to be connected to the computer;
   a plurality of downstream universal serial bus ports, each configured to receive a cable or other connection from a peripheral device; and
   an MP3 connection port located in the depression and configured to be connected to the MP3 player when the MP3 player is in the depression, wherein the MP3 connection port is a multiple-pin dock connector for the MP3 player; and
   wherein the depression is configured to contain a portion of the MP3 player and to retain the MP3 player in place during a time in which the MP3 player is connected to the MP3 connection port.

20. The USB hub of claim 19 further comprising a first adapter configured to be removably inserted within the depression and having an aperture therein sized and shaped to provide access therethrough to the MP3 connection port when the first adapter is located within the depression.

21. The USB hub of claim 19 further comprising a first adapter configured to be removably inserted within the depression, wherein the first adapter has a first thickness, the USB hub further comprising a second adapter configured to be removably inserted within the depression, wherein the second adapter has a second thickness that is greater than the first thickness; and wherein the first thickness is selected, and the first adapter is tailored, for the USB hub containing the first adapter to receive a first MP3 player of a first size when the first MP3 player is electrically connected to the MP3 connection port, and the second thickness is selected, and the second adapter is tailored, for the USB hub containing the second adapter to receive a second MP3 player of a second size when the second MP3 player is electrically connected to the MP3 connection port, wherein the second size is smaller than the first size.

22. The USB hub of claim 19 wherein the USB hub includes a bottom surface, a top surface spaced apart from the bottom surface, and a sidewall extending from the bottom surface to the top surface, wherein the depression is in the top surface, and wherein the upstream universal serial bus port that is configured to be connected to the computer, and the plurality of downstream universal serial bus ports, are all located in the housing, and wherein the upstream universal serial bus port and the plurality of downstream universal serial bus ports are all located at the sidewall.

23. The USB hub of claim 19 further comprising a power port located in the housing.

24. The USB hub of claim 19 further comprising a status indicator, wherein at least a portion of the housing comprises a translucent material and the status indicator is visible through the translucent material.

\* \* \* \* \*